United States Patent [19]
Van De Wiel

[11] Patent Number: 5,448,192
[45] Date of Patent: Sep. 5, 1995

[54] DATA PROCESSING CIRCUIT INCLUDING A PLURALITY OF SERIALLY CLOCKED SUB-CIRCUITS

[75] Inventor: Petrus J. A. M. Van De Wiel, Eindhoven, Netherlands

[73] Assignee: U.S. Philips Corporation, New York, N.Y.

[21] Appl. No.: 990,781

[22] Filed: Dec. 9, 1992

[30] Foreign Application Priority Data

Dec. 9, 1991 [EP] European Pat. Off. .......... 91203207

[51] Int. Cl.⁶ ............................................. H03K 5/13
[52] U.S. Cl. .................................... 327/141; 327/154; 327/293; 327/299; 327/58
[58] Field of Search ............... 307/269, 268, 452, 453, 307/273, 272.1; 328/63, 164; 327/141, 154, 165, 166, 291, 293, 299, 58

[56] References Cited

U.S. PATENT DOCUMENTS

| | | | |
|---|---|---|---|
| 3,760,282 | 9/1973 | Arnold et al. | 307/351 |
| 4,015,144 | 3/1977 | Brouckaert | 328/164 |
| 4,021,685 | 5/1977 | Goodall et al. | 328/164 |
| 4,585,952 | 4/1986 | Yamamoto | 328/164 |
| 4,686,482 | 8/1987 | Zoetman et al. | 307/269 |
| 4,761,567 | 8/1988 | Walters, Jr. et al. | 328/63 |
| 4,801,818 | 1/1989 | Schroedinger | 307/269 |
| 4,837,463 | 6/1989 | Okitaka et al. | 307/269 |
| 4,847,516 | 7/1989 | Fujita et al. | 328/63 |
| 4,870,665 | 9/1989 | Vaughn | 328/61 |
| 4,929,854 | 5/1990 | Iino et al. | 307/452 |
| 4,937,468 | 6/1990 | Shekhawat et al. | 328/164 |
| 5,033,067 | 7/1991 | Cole et al. | 377/54 |
| 5,140,184 | 8/1992 | Hamamoto et al. | 307/269 |
| 5,150,068 | 9/1992 | Kawashima et al. | 307/269 |
| 5,225,175 | 7/1993 | Mori et al. | 307/269 |

FOREIGN PATENT DOCUMENTS 0133359 2/1985 European Pat. Off. .

OTHER PUBLICATIONS

1990 IEEE Proceedings, "A Linear-Array WSI Architecture for Improved Yield and Performance" by Robert W. Horst, pp. 85–91.

"The Behavoir of Flip-Flops Used as Synchronizers and Prediction of Their Failure Rate", H. Veendrick, IEEE Journal of Solid-State Circuits, vol. SC-15, No. 2, Apr. 1980.

*Primary Examiner*—Timothy P. Callahan
*Assistant Examiner*—T. Lam
*Attorney, Agent, or Firm*—Bernard Franzblau

[57] ABSTRACT

An information processing system comprises a sub-circuits, each performing a part of the processing of the information or data. The operation of the sub-circuits is synchronized by means of clock signals applied to clock inputs of the sub-circuits. The clock signals are derived from a system clock and are transferred to each sub-circuit via the sub-circuit or sub-circuits preceding that sub-circuit in the data processing chain. To avoid deterioration of the clock pulses while they are transferred between the sub-circuits, clock regeneration circuitry is arranged in the chain of sub-circuits. The clock regeneration circuitry is preferably integrated together with the data-processing sub-circuits.

18 Claims, 3 Drawing Sheets

DATA PROCESSING CIRCUIT INCLUDING A PLURALITY OF SERIALLY CLOCKED SUB-CIRCUITS

BACKGROUND OF THE INVENTION

This invention relates to a circuit arrangement comprising a plurality of sub-circuits for data processing, the sub-circuits being provided with clock inputs for receiving clock signals for synchronizing the operation of the sub-circuits. In particular, the invention relates to a circuit arrangement comprising semiconductor integrated circuits for data processing wherein the operation of the sub-circuits in the system has to be synchronized for proper operation. In the context of the present description with, by data processing is meant the handling of any type of data independent of the associated information content or the way the information is represented.

Such a circuit arrangement is known from EP-A 0 133 359. That document describes a microprocessor chipset in which each chip receives clock pulses from a system clock and is synchronized by an associated controller. The chips are provided with adjustable delay circuits to adjust the timing of the clock pulses. Adjustment of the delay circuits occurs in response to a system clock pulse and to an internal clock pulse from the chip. For each chip or sub-circuit such a separate synchronizer is necessary to adjust the clock signals to the speed of the flow of the data signals through the circuit arrangement.

The known circuit arrangement has several drawbacks. When implemented in a digital circuit, the controller circuits must be faster than any data processing circuitry clocked by the clock pulses. Consequently, the maximum possible speed of the data processing circuitry is below the speed achievable with the available technology. The use of analog circuitry in the controller, to enhance speed, makes it impossible to integrate the circuit on a semiconductor chip in, for example, CMOS technology without a loss of performance of the overall circuit.

Another very serious disadvantage of the use of synchronizers in a data processing system is that errors are possible in the synchronizers while transferring clock pulses from the central clock to the individual sub-circuits. As is shown by H. J. M. Veendrick in the article "The Behavior of Flip-Flops Used as Synchronizers and Prediction of Their Failure Rate", in IEEE Journal of solid-state circuits, Vol SC-15, No. 2, April 1980, pp 169–176, there is a chance that a metastable state occurs in the synchroniser, for example, when the temperature of the circuit changes. This causes an imperfect phase relationship whereby data pulses are lost or duplicated. The failure rate increases greatly with the signal frequency.

SUMMARY OF THE INVENTION

It is, inter alia, an object of the invention to provide a circuit arrangement according to the introductory paragraph in which the synchronization of sub-circuits relative to one another is obtained without the need to provide a synchronizer for each sub-circuit or integrated circuit chip. It is also an object of the invention to provide such a circuit arrangement that can operate properly in a range of frequencies, several orders of magnitude wide, up to the maximum frequency allowed by the integration technology.

To this end, the invention is characterized in that the circuit arrangement comprises at least one sub-circuit provided with a clock output, coupled via the sub-circuit to a clock input of that sub-circuit, to clock output is coupled with a clock input of another sub-circuit. As a result, at least a part of the circuit arrangement receives the synchronization clock information not from an external clock via a synchronizing circuit, but from a clock output of a data processing sub-circuit. The clock signals and the signals representing the processed data pass in parallel from one sub-circuit to a next one. Synchronization is now a matter of making sure that the clock signals that pass from one sub-circuit to the next, via an interconnect, are subject to an equal delay and to the same, i.e. equal, disturbances as the data signals. This can be realised relatively easy by making the interconnects for the clock and the data signals alike as much as possible alike.

Advantageously, the circuit arrangement according to the invention is further characterized in that said clock output is coupled to an input of a clock signal regeneration circuit having an output coupled to said clock input of said other sub-circuit. The deterioration of the clock pulses due to traversing the interconnect is to be repaired by such a regeneration circuit. The circuit arrangement according to the invention may be further characterized in that the clock signal regeneration circuit is included in a clock input portion of said other sub-circuit.

A circuit arrangement in accordance to the invention is further characterized in that it comprises a chain of sub-circuits for data processing, each sub-circuit in the chain comprising a data output coupled to a data input of a next sub-circuit and each sub-circuit in the chain comprising a clock output coupled to a clock input of the next sub-circuit in the chain comprising a clock output coupled to a clock input of the next sub-circuit. The clock signals are guided in parallel with the data to be processed through the chain of sub-circuits. Synchronization along the chain is optimised.

An embodiment of the circuit arrangement according to the invention is characterized in that the clock input of a clock signal regeneration circuit comprises a plurality of clock input terminals for providing thereat a corresponding plurality of clock signals having a frequency relationship to each other, the clock signal regeneration circuit comprising detection means for detecting characteristic features in the clock signals and pulse generation means for regenerating clock signals with parameters derived from an occurrence of said characteristic features. Deterioration of the pulses is significant in high frequency applications wherein the wavelength of the clock and data signals is comparable with the length of the interconnect between the sub-circuits. The deterioration of the clock signals while traversing the interconnect will influence mainly the shape and duty cycle and the position of the edges but will not influence the frequency. The occurrence of certain characteristic features in one of the clock signals can be used to trigger the generation of a new clock pulse, whereas the occurrence of a feature in another clock signal is to be used to determine further parameters of the pulse, such as pulse-length or the duty cycle of the clock signal. As the frequency is not influenced, regeneration of clock signals can be obtained without programming the regeneration circuits to a particular shape or length of the clock pulses.

This embodiment of the circuit arrangement according to the invention may be further characterized in that the clock signal regeneration circuit has an input and output comprising an equal number of input and output terminals, and in that the clock signal regeneration circuit is arranged for regenerating clock signals with frequency and phase relationships which are equal to the frequency and phase relationships between the clock signals available at the input terminals of the clock signal regeneration circuit. The input and output clock signals of the regeneration circuit have the same characteristics. Therefore, only one type of regeneration circuit is necessary in the whole chain of sub-circuits, which contributes to ease of design and a modular architecture of the circuit arrangement.

A preferred embodiment of the circuit arrangement according to the invention is characterized in that the clock signal regeneration circuit comprises two input terminals for first and second input clock signals, respectively, and two output terminals for first and second output clock signals, respectively, in that the detection means are arranged for detecting the occurrence of one type of feature in the input clock signals and in that the pulse generation means are arranged for generating a rising edge in the first and a falling edge in the second output clock signals in response to the occurrence of a feature of said one type in the first clock signal and for generating a falling edge in the first and a rising edge in the second output clock signal in response to the occurrence of a feature of said one type in the second input clock signal. If the input clock signals are approximately each others inverted signal and the edges of the output clock signals are generated with a delay that is substantially equal, the output clock signals are approximately each others inverted signals as well. Regeneration of clock signals occurs then without the need of special delay circuits or some kind of local knowledge in the regeneration circuit about the desired pulse shape. The timing circuitry of the circuit arrangement can be made relatively simple and reliable. The only condition remaining is that the propagation of the two clock signals through the sub-circuit takes the same time interval. This can be ensured by accurate dimensions of the relevant circuit elements.

The circuit arrangement according to the invention is particularly advantageous in applications using integrated circuits for high frequency data processing. One or several sub-circuits for data processing and associated regeneration circuitry may be integrated on a single semiconductor integrated circuit chip. When several sub-circuits are integrated on one chip, clock signals are passed between different portions and regenerated at several places of on this chip.

The invention also relates to an integrated circuit for application in such a circuit arrangement. According to the invention such an integrated circuit comprises at least one sub-circuit for data processing and at least one clock signal regeneration circuit.

BRIEF DESCRIPTION OF THE DRAWINGS

These and other, more detailed aspects of the invention will now be elucidated by way of example with reference to the accompanying drawings, in which.

DETAILED DESCRIPTION OF THE PREFERRED EMBODIMENT

Figure 1:
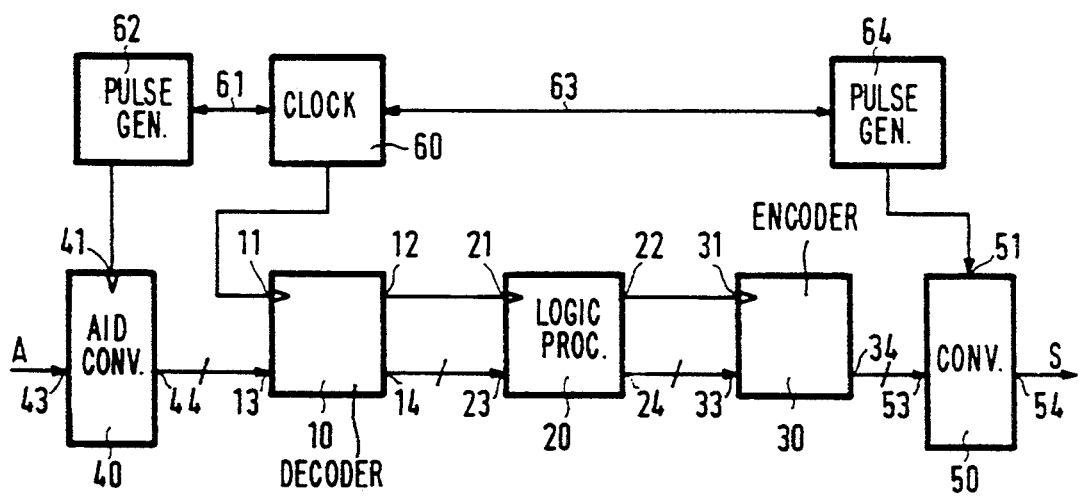
FIG. 1 shows diagrammatically a circuit arrangement according to the invention.

FIG. 1 shows a circuit arrangement for information processing. The circuit arrangement shown comprises three sub-circuits 10, 20 and 30, an input circuit 40 and an output circuit 50. By way of example, the circuit arrangement may consist of a decoder 10, a logic processor 20 and an encoder 30. The input circuit 40 is, for example, an analog to digital convertor and the output circuit 50 a parallel to serial convertor. Each of the sub-circuits may be implemented on a separate integrated circuit with or without attached discrete components, or even comprise a few integrated circuits. Alternatively, two or more of the sub-circuits may be integrated on a single integrated circuit.

An information signal A is applied to a data input 43 of the input circuit 40. After preprocessing, in the example conversion of an analog signal into a digital signal, the information signal is passed to the sub-circuit 10 via its data input 13. The information is subsequently processed by this sub-circuit, in the present example the coding of the data is changed from the format generated by the analog-to-digital convertor to a format digestible by the logic processor, and passed to the next sub-circuit 20 via the data output 14 and the data input 23. After processing in this sub-circuit, i.e. performing certain logic and arithmetic operations upon the data, the processed data is passed to a last sub-circuit 30. In the given task assignment of the sub-circuits the coding format of the digital data is changed again and the coded data are supplied in parallel at the data output 34 connected to an input 53 of the output circuit 50. In the output circuit 50 the processed data is buffered and subsequently becomes available at the serial output 54 as a serial information signal S.

The output and output circuits 40 and 50 receive timing signals that are synchronized to the frequency at which the sub-circuits 10, 20 and 30 operate. The additional timing signals for the input and output circuits are generated in pulse generators 62 and 64 and synchronisation between these pulse generators and the system clock 60 is, for example, assured by connections 61 and 63. The three sub-circuits 10, 20 and 30 are all operating at the same frequency, the clock signals being derived from system clock 60 and presented to each of the sub-circuits 10, 20 and 30 via clock inputs 11, 21 and 31, respectively.

According to the invention, all of these clock inputs are not connected to a clock output of the system clock 60, only the clock input 11 of the first sub-circuit 10. The clock inputs of the downstream sub-circuits 20 and 30 are each coupled to a clock output 12 and 22 of the previous sub-circuits 10 and 20, respectively. The clock outputs 12 and 22 of the sub-circuits 10 and 20 are coupled by a path or internal circuit through the respective sub-circuits to the clock inputs 11 and 21, respectively, so that each of these sub-circuits has its clock output via such sub-circuit to the clock input of that sub-circuit. Consequently, synchronization of the downstream circuits 20 and 30 is achieved. As the clock signal flows in parallel with the data signals separate synchronizers and tuning thereof is unnecessary.

Figure 2:
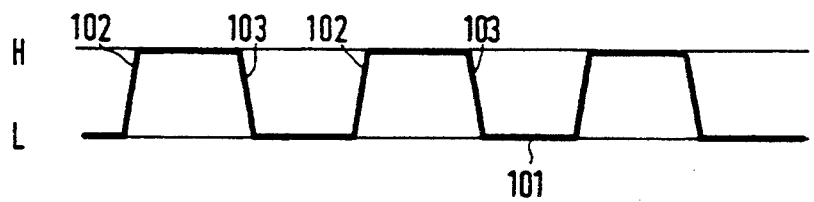
FIG. 2 illustrates a possible deterioration of clock pulses.
Figure 2:
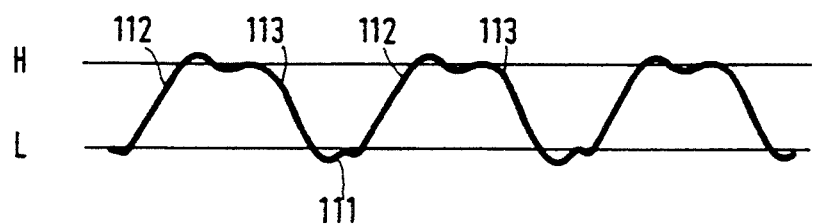

FIG. 2 illustrates a possible distortion of the clock pulses while traversing an interconnect between two sub-circuits. In the Figure, "H" indicates the "high" level and "L" the "low" level of a signal. The input clock signal 101, shown in the upper portion of the Figure, consists of pulses with steep rising and falling edges 102, 103 and a duty cycle of about 50%, i.e. the length of the "high" period of the signal is approximately equal to the length of the "low" period. In the lower portion of the Figure, a possible signal shape 111 is shown after traversing an interconnect. The "high" and "low" periods in the signal exhibit some transients, the rising and falling edges 112, 113 may be more gradual and, in particular, the duty cycle may be increased or decreased. Due to the more gradual edges the change in duty cycle will be even more prominent.

Figure 3:
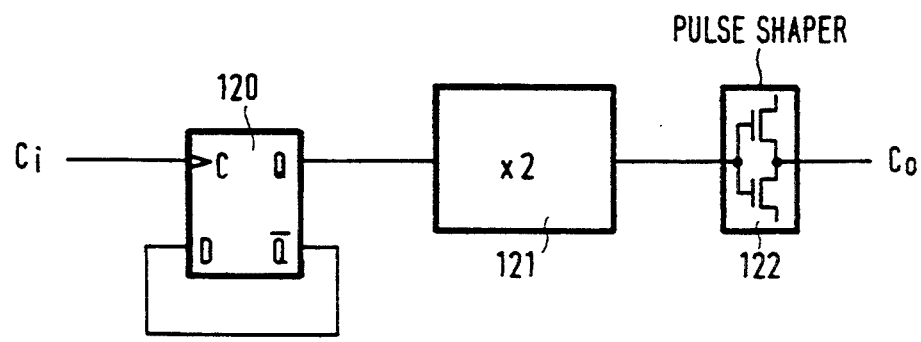
FIG. 3 shows a circuit to restore the clock pulses.

The deterioration of the clock signal while traversing one or more sub-circuits poses serious limits on the length of the chain of sub-circuits. In particular, in a high frequency application, where the period of the clock signal has a length comparable to the time needed to traverse a sub-circuit or to traverse the interconnect between sub-circuits, the system will fail. FIG. 3 shows an example of a circuit arrangement in which the clock signal at the end of an interconnect is regenerated. The regeneration circuit shown comprises an edge triggered frequency divider 120. By way of example there is shown a D-flip-flop switched as a frequency divider by connecting the $\overline{Q}$-output to the D-input, followed by a frequency multiplier 121, for example, a phase locked loop, and a pulse shaper 122. In an alternative embodiment, the frequency multiplier is triggered by the rising edges of the clock signal pulses and is followed by a frequency divider.

Figure 4:
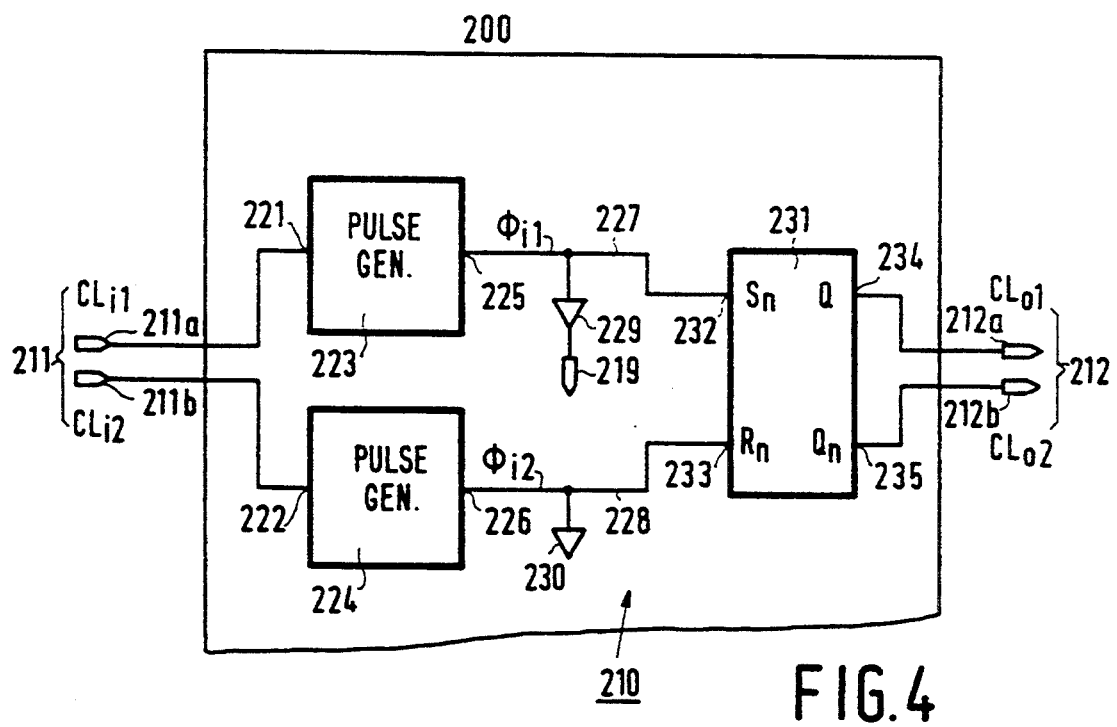
FIG. 4 shows diagrammatically an embodiment of a clock signal regeneration circuit using more than one input signal.

In FIG. 4 an implementation of a preferred embodiment is diagrammatically shown. An integrated circuit 200 comprises a clock input 211 having two clock input terminals 211a and 211b for receiving two distinct clock signals of the same frequency. The integrated circuit comprises a multitude of further terminals, bonding pads or pinouts, not shown, for voltage supply, control signals, data input and output. The two clock input terminals are connected to the inputs 221, 222 of first and second internal pulse generators 223 and 224, respectively. These internal pulse generate 223 and 224 generates clock pulses $\phi_{i1}$ and $\phi_{i2}$ for internal use in the circuitry of the integrated circuit 200 or in a portion of the same.

The outputs 225 and 226 at which the clock pulses $\phi_{i1}$ and $\phi_{i2}$ become available are coupled via connections 227 and 228 to the set ($S_n$) and reset ($R_n$) inputs of an RS-flip-flop 231. The connections between the pulse generators and the RS-flip-flop may contain buffers or other circuitry. In the connection 227 from the first internal pulse generator 223 to the RS-flip-flop a tap 219 for the internal clock pulses $\phi_{i1}$ is provided to guide the pulse to the data processing portion of the circuit or sub-circuit. The tap 2 19 is coupled to the connection 227 via a buffer circuit 229. In the other connection 228, between the second internal pulse generator 224 and the RS-flip-flop, an equivalent buffer circuit 230 is added as a dummy load for achieving symmetry between the two connections 227 and 228. If the clock pulses $\phi_{i2}$ from the second internal pulse generator 224 are not used in the sub-circuit, the buffer circuit 230 is present but has its output unconnected. Additional taps may be provided at the same or at the other connection.

Output 225 of the first internal pulse generator 223 is coupled to the $S_n$-input 232 of the RS-flip-flop 231 and output 226 of the second internal pulse generator 224 is coupled to the $R_n$-input 233. The Q- and $Q_n$-outputs 234 and 235 of the RS-flip-flop are coupled to the clock output terminals 212a and 212b, respectively, of the clock output 212 of the circuit. In between the Q- and $Q_n$-outputs and the output terminals 212a and 212b a series of buffers may be arranged. The arrangement of internal pulse generators 223,224 and RS-flip-flop 231 forms a clock signal regeneration circuit 210 from which a clock pulse for the sub-circuit 200 is derived via a tap 219.

The clock regeneration circuit 210 as described above works as follows. As a starting point it is assumed that the circuit is in a stage during normal operation in which the Q-output 234 of the RS-flip-flop 231 is "low" and the $Q_n$-output 235 is "high". When a rising edge of a clock input signal arrives at input 221 of the first internal pulse generator 223, the latter generates a pulse $\phi_{i1}$ at its output 225. Alternatively, the pulse generator may be triggered by the occurrence of a falling edge. The pulse $\phi_{i1}$ serves to clock the circuit. The pulse $\phi_{i1}$ is also transmitted to the $S_n$ input 232 of the RS-flip-flop 231, consequently the Q-output of the RS-flip-flop 23 1 will go "high" and the $Q_n$-output 235 will go "low". When a rising edge arrives at the input 222 of the second internal pulse generator 224 a pulse $\phi_{i2}$ is generated that is transferred to the $R_n$-input of the RS-flip-flop 231. Consequently, the states of the Q- and $Q_n$-outputs are reversed, i.e. the Q-output 234 will go "low" and the $Q_n$-output 235 will go "high". Due to the internal structure of an RS-flip-flop, more time is needed after the arrival of a pulse at the $S_n$-input for the $Q_n$-output to change state than for the Q-output to change state, and vice versa when a pulse arrives at the $R_n$-input. Because of this behaviour the output clock signals generated have a duty cycle which deviates from 50%.

When the RS-flip-flop used is symmetrical in the sense that the delays between a pulse arriving at the $S_n$-input till the changes of states of the Q- and $Q_n$-outputs, respectively, are equal to the delays between a pulse arriving at the $R_n$-input till the changes of states of the $Q_n$- and Q-outputs, respectively, the signals at the Q- and $Q_n$-outputs can be used directly as clock signals. However, due to the above mentioned internal structure of the RS-flip-flop, these clock signals will not have a 50% duty cycle and, consequently, they will not be exactly each others inverted signals.

The outputs 225 and 226 at which the clock pulses $\phi_{i1}$ and $\phi_{i2}$ become available are coupled via connections 227 and 228 to the set and reset inputs of the RS-flip-flop 231, respectively. When the delay from the arrival of a rising edge at input terminal 211a until the moment the level at output terminal 212a changes is almost identical to the corresponding delay from input terminal 211b until output terminal 212b, the phase difference between the clock signals $CL_{i1}$ and $CL_{i2}$ at the respective input terminals is transferred to the clock signals $CL_{o1}$ and $CL_{o2}$ at the respective output terminals. By a well-designed lay-out together with accurate dimensions of the regeneration circuitry, it is very well possible to achieve such a conservation of the phase difference. It is noted that in the circuit the frequency and the phase difference of the input clock signals also is fully maintained when the actual shape and duty cycle of the clock signals deteriorates in approximately the same manner during transfer between regeneration circuits. The signal paths for the clock signals, and also for the data signals, should be as much alike as possible.

Figure 5:
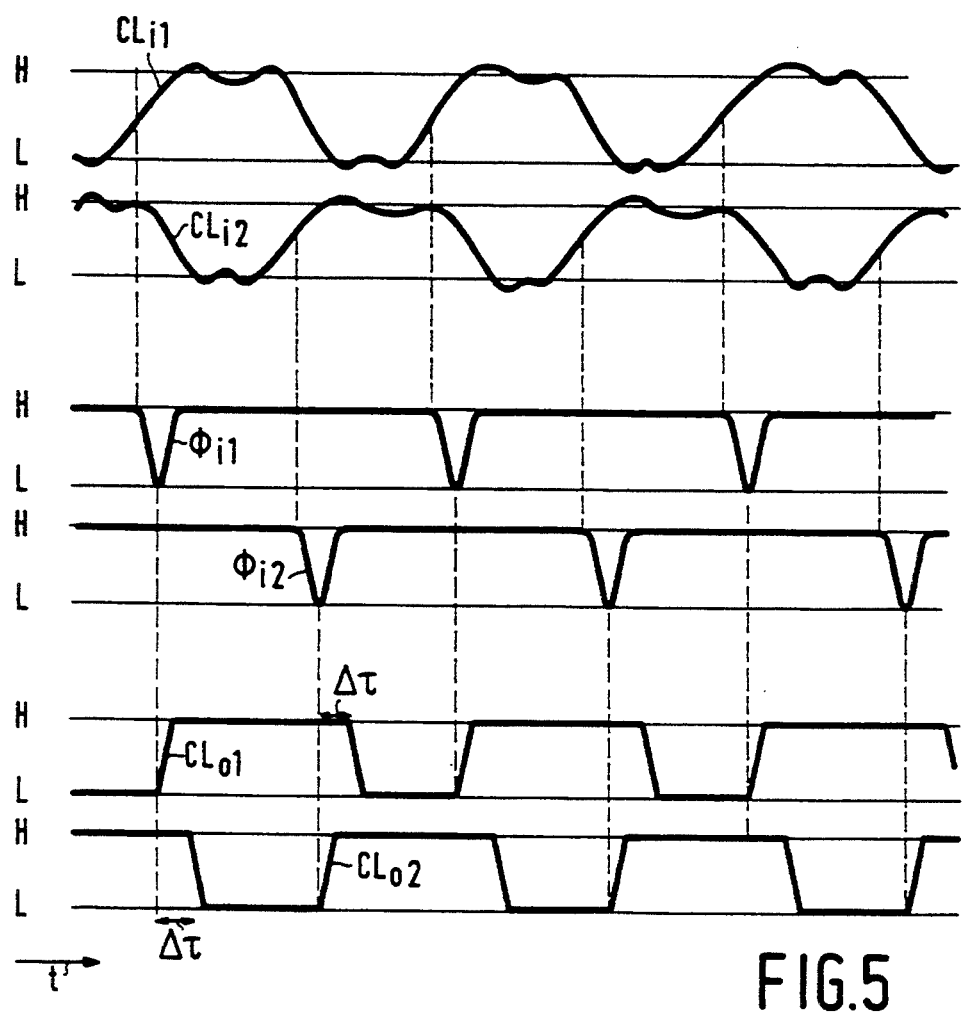
FIG. 5 shows a few timing diagrams of clock signals in the circuit of FIG. 4 to illustrate the operation of this circuit.

In FIG. 5 pulse shapes are shown at various points in the circuit described with reference to FIG. 4. The horizontal axis in the Figure represents time t. The two upper curves $CL_{i1}$ and $CL_{i2}$ represent possible clock signal shapes at the inputs 221 and 222 of the first and second internal pulse generators 223 and 224. As both clock signals started from similar pulse generators in an earlier circuit and have traversed identical interconnects, the pulse shapes of the two clock signals is largely identical. In the internal pulse generators 223 and 224 pulses $\phi_{i1}$ and $\phi_{i2}$ are generated, shown in the middle two curves. The timing of pulses $\phi_{i1}$ is synchronized with a point in the rising edges in clock signal $CL_{i1}$ and the timing of pulses $\phi_{i2}$ is synchronized with similar points in the clock signal $CL_{i2}$. Finally the lower two curves show the first and second output clock signals $CL_{o1}$ and $CL_{o2}$, available at the output clock terminals 212a and 212b. The rising edges of the first output clock signal $CL_{o1}$ are synchronized with the pulses $\phi_{i1}$, the falling edges with the pulses $\phi_{i2}$. The second output clock signal $CL_{o2}$ is synchronized the other way around, the rising edges are triggered by pulses $\phi_{i2}$, the falling edges by pulses $\phi_{i1}$. The delays, indicated in the Figure with $\Delta\tau$, represent the difference in time between the switching of the $Q_n$-output and the Q-output in a flip-flop after a pulse arrives at the $R_n$, input and the corresponding difference in time between switching of the Q- and $Q_n$-outputs after a pulse arrives at the $S_n$-input. As shown in FIG. 5, this leads to output clock pulses wherein the duty cycle deviates from 50%.

Figure 6:
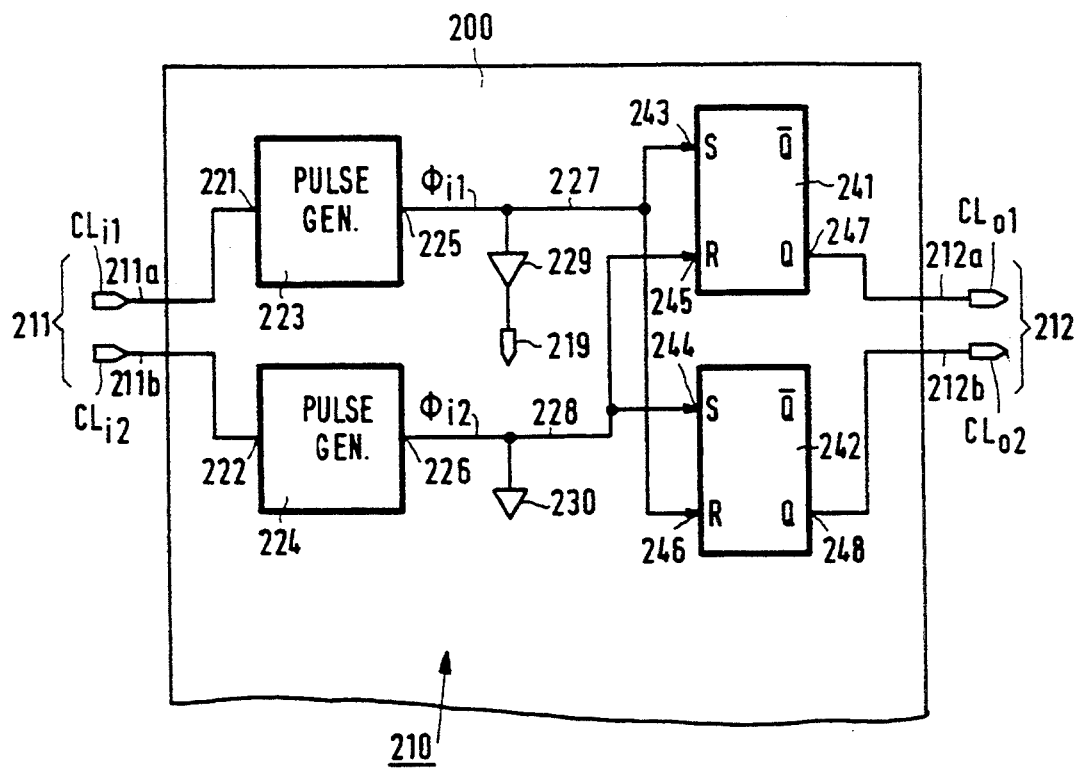
FIG. 6 shows diagrammatically another embodiment of a clock signal regeneration circuit.

With the above described embodiment a better clock output signal, in terms of steepness of the edges, length of the "high" and/or "low" periods, response time at the R- or S-inputs, or duty-cycle, can be obtained at a high operation frequency, at one of both outputs. However, the performance of the other output is then reduced and symmetry between the two outputs is lost. To maintain symmetry, for example to achieve a 50% duty cycle, two identical flip-flops have to be used. Such an embodiment is illustrated in FIG. 6 which is identical to FIG. 4 with the exception of the two RS-flip-flops 24 1 and 242 replacing the single flip-flop 231 in that Figure. Identical reference signs are used for elements common to elements in FIG. 4 and no description is given here for those elements. Reference is made to the description of FIG. 4 for further details concerning those elements.

Output 225 of the first internal pulse generator 223 is coupled to the S-input 243 of the first RS-flip-flop 241 and to the R-input 246 of the second RS-flip-flop 242. Output 226 of the second internal pulse generator 224 is coupled to the S-input 244 of the second RS-flip-flop 242 and to the R-input 245 of the first RS-flip-flop 241. The Q-outputs 247 and 248 of the two RS-flip-flops are coupled to the clock output terminals 212a and 212b, respectively, of the clock output 212 of the circuit.

This embodiment of a clock regeneration circuit works as follows. Again, as a starting point it is assumed that the Q-output of the first RS-flip-flop 241 is "low" and the Q-output of the second RS-flip-flop 242 is "high". When a rising edge of a clock input signal arrives at input 221 of the first internal pulse generator 223, the latter generates a pulse $\phi_{i1}$ at its output 225. The pulse $\phi_{i1}$ serves to clock the circuit and is also transmitted to the S input of the first RS-flip-flop 241 and to the R-input of the second RS-flip-flop 242. Consequently, the Q-output of the first RS-flip-flop 241 will go "high" and that of the second RS-flip-flop 242 will go "low". When a rising edge arrives at the input 222 of the second internal pulse generator 224, a pulse $\phi_{i2}$ is generated that is transferred to the R-input of the first RS-flip-flop 241 and to the S-input of the second RS-flip-flop 242. Consequently, the states of the Q-outputs of both RS-flip-flops are reversed, i.e. the Q-output of the first RS-flip-flop 241 will go "low" and that of the second RS-flip-flop 242 will go "high".

This embodiment can also be used to achieve a 50% duty cycle when the RS-flip-flops are not symmetrical in the sense that the delays between a pulse arriving at the S-input till the changes of states of the Q- and $\overline{Q}$-outputs, respectively, are equal to the delays between a pulse arriving at the R-input till the changes of states of the $\overline{Q}$- and Q-outputs, respectively.

Figure 7:
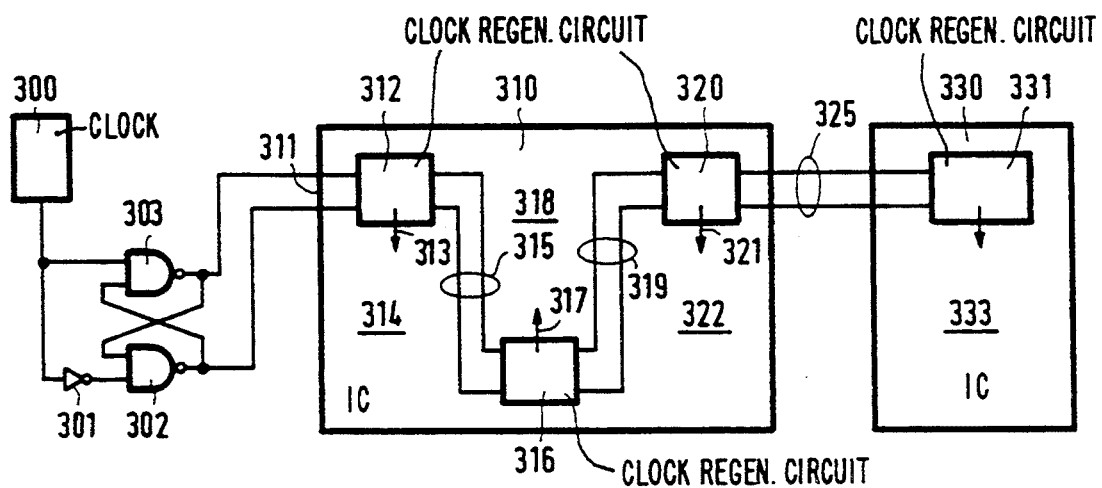
FIG. 7 illustrates a chain of sub-circuits with intermediate sets of regeneration circuits.

In FIG. 7 two integrated circuits 310 and 330 are shown in cascade. For simplicity, only connections relevant to the clock signals are illustrated, data and power connections are not shown. The two integrated circuits 310 and 330 are clocked with a system clock 300 which generates clock pulses. The clock pulses are provided to a first input of a first NAND-gate 303 and, after inversion in an invertor 301, to a first input of a second NAND-gate 302. The second inputs of both NAND-gates are connected to the outputs of the other NAND-gate, thereby inhibiting both outputs to be "high" at the same time. The output signals of both NAND-gates are input to clock input terminals 311 of the first integrated circuit 3 10. The signals are regenerated by a clock regeneration circuit 312, from an output 313 of which a clock signal is tapped to synchronise a first data processing sub-circuit 314 in the integrated circuit 310.

The clock outputs of the first regeneration circuit are connected to clock inputs of a second clock regeneration circuit 316 on the same integrated circuit, via an on-chip interconnect 315. A tap 317 at this second clock regeneration circuit 316 is provided to clock a second sub-circuit 318. As illustrated in the embodiment shown, the integrated circuit 310 comprises a third regeneration circuit 320 and a third data processing sub-circuit 322. The latter is synchronized from the third clock regeneration circuit via a tap 32 1. The inputs of the third clock regeneration circuit 320 are coupled to the outputs of the second clock regeneration circuit 316 via on-chip interconnect 319.

The clock outputs of the third regeneration circuit 320 are coupled, via an off-chip interconnect 325, to the clock input terminals of a second integrated circuit 330. This second integrated circuit comprises, for example, only one data processing circuit 333 and one clock regeneration circuit 331.

I claim:

1. A synchronized data processing circuit arrangement which comprises a chain of sub-circuits for data processing, each sub-circuit in the chain comprising a data output coupled to a data input of a next sub-circuit and each sub-circuit in the chain comprising a clock output coupled to a clock input of the next sub-circuit, the sub-circuits including clock inputs for receiving clock signals for synchronizing the operation of the sub-circuits, wherein the circuit arrangement comprises at least one sub-circuit provided with a clock output coupled via at least one internal circuit of the one sub-circuit to a clock input of that sub-circuit, which clock output is coupled to a clock input of s next sub-circuit of said chain of sub-circuits.

2. A synchronized data processing circuit arrangement, comprising: a plurality of sub-circuits for serially processing signal data, the sub-circuits including clock inputs for receiving clock signals for synchronizing the operation of the sub-circuits, wherein the circuit arrangement comprises at least one sub-circuit provided with at least one internal circuit which passes a clock signal at a clock input of the one sub-circuit to a clock output of that sub-circuit, and a clock signal regeneration circuit having an input coupled to the clock output of said one sub-circuit and having an output coupled to a clock input of a further sub-circuit of said plurality of sub-circuits, wherein the clock input of said clock signal regeneration circuit comprises a plurality of clock input terminals for receiving a corresponding plurality of distorted clock signals having a frequency relationship to each other, the clock signal regeneration circuit comprising detection means for detecting characteristic features in the clock signals and pulse generation means for regenerating clock signals with parameters derived from an occurrence of said characteristic features.

3. A synchronized data processing circuit arrangement according to claim 2, wherein the clock signal regeneration circuit has an input and an output comprising an equal number of input and output terminals, and the clock signal regeneration circuit regenerates the clock signals with frequency and phase relationships which are equal to the frequency and phase relationships between the clock signals as provided at the input terminals of the clock signal regeneration circuit.

4. A synchronized data processing circuit arrangement according to claim 2, wherein the clock signal regeneration circuit comprises two input terminals for first and second input clock signals, respectively, and two output terminals for first and second output clock signals, respectively, in that the detection means detect the occurrence of one type of characteristic feature in the input clock signals and the pulse generation means generate a rising edge in the first and a falling edge in the second output clock signals in response to the occurrence of a characteristic feature of said one type in the first clock signal and generate a falling edge in the first and a rising edge in the second output clock signal in response to the occurrence of a characteristic feature of said one type in the second input clock signal.

5. A synchronized circuit comprising:
a signal input terminal,
at least first and second sub-circuits each comprising a signal input, a signal output and a synchronizing input,
means coupling the signal input of the first sub-circuit to said signal input terminal, the signal input of the second sub-circuit to the signal output of the first sub-circuit and the signal output of the second sub-circuit to a signal output terminal,
means for supplying a periodic synchronizing signal to the synchronizing input of the first sub-circuit, and
second means for coupling the synchronizing input of the second sub-circuit to a synchronizing output of the first sub-circuit whereby the second sub-circuit receives a synchronizing signal via the first sub-circuit.

6. A synchronized circuit according to claim 5, wherein said second coupling means comprises a synchronizing signal regeneration circuit included in the synchronizing input of said second sub-circuit.

7. A synchronized circuit according to claim 5, which comprises a chain of sub-circuits for data processing, each sub-circuit in the chain comprising a data output coupled to a data input of a next sub-circuit and each sub-circuit in the chain comprising a synchronizing output coupled to a synchronizing input of the next sub-circuit.

8. A synchronized circuit as claimed in claim 5 wherein said second coupling means comprises a synchronizing signal regeneration circuit coupled between the synchronizing output of the first sub-circuit and the synchronizing input of the second sub-circuit.

9. A synchronized circuit as claimed in claim 5 wherein said means for supplying a periodic synchronizing signal comprises a clock generator external to said first and second sub-circuits for supplying clock signals, and wherein the clock signals and signals supplied by said signal input terminal flow in parallel through said first sub-circuit and then flow in parallel through the second sub-circuit.

10. A synchronized circuit as claimed in claim 5 wherein said means for supplying a periodic synchronizing signal comprises a clock generator supplying clock signals, and
said sub-circuits each provide a circuit path for the clock signals and a circuit path for the signals supplied by said signal input terminal, said circuit paths in each sub-circuit providing equal signal delay times.

11. The synchronized circuit as claimed in claim 5 wherein the synchronizing input of the first sub-circuit is coupled to the synchronizing output thereof via an internal circuit of the first sub-circuit so that a periodic synchronizing signal received at the synchronizing input of the first sub-circuit passes through said first sub-circuit to its synchronizing output.

12. A synchronized circuit according to claim 10, wherein said first and second sub-circuits and said synchronizing signal regeneration circuit are integrated on a single semiconductor integrated circuit.

13. A synchronized circuit according to claim 12, wherein a plurality of sub-circuits and synchronizing signal regeneration circuits are integrated on a single integrated circuit, and wherein a synchronizing output of the second sub-circuit is coupled to the synchronizing input of that sub-circuit via at least one internal circuit of the second sub-circuit.

14. A synchronizing circuit according to claim 8, comprising at least one sub-circuit for data processing and at least one synchronizing signal regeneration circuit which together comprise an integrated circuit.

15. A synchronized data processing circuit, which comprises: a chain of sub-circuits for data processing, the sub-circuits including clock inputs for receiving clock signals for synchronizing the operation of the sub-circuits, wherein the circuit comprises at least one sub-circuit provided with at least one internal circuit which passes a clock signal at a clock input of the one sub-circuit to a clock output of that sub-circuit, and a clock signal regeneration circuit having an input coupled to the clock output of said one sub-circuit and having an output coupled to a clock input of a next sub-circuit of said chain of sub-circuits, each sub-circuit in the chain comprising a data output coupled to a data input of a next sub-circuit and each sub-circuit in the chain comprising a clock output coupled to a clock input of the next sub-circuit via a respective clock signal regeneration circuit.

16. A synchronized data processing circuit comprising: a plurality of sub-circuits for serially processing signal data, the sub-circuits including clock inputs for receiving clock signals for synchronizing the operation of the sub-circuits, wherein the circuit comprises at least one sub-circuit provided with at least one internal circuit which passes a clock signal at a clock input of the one sub-circuit to a clock output of that sub-circuit, and a clock signal regeneration circuit having an input coupled to the clock output of said one sub-circuit and having an output coupled to a clock input of a further sub-circuit of said plurality of sub-circuits, wherein the clock input of said clock signal regeneration circuit comprises at least first and second clock input terminals for receiving externally supplied first and second out of phase clock signals of the same frequency and with pulse shape distortion, and the clock signal regeneration circuit comprises;
   means for detecting a given characteristic feature in the first and second clock signals, and
   pulse generation means coupled to said detection means for regenerating the clock signals as a function of the detected given characteristic feature of said first and second clock signals.

17. A synchronized data processing circuit comprising: a plurality of sub-circuits for serially processing signal data, the sub-circuits including clock inputs for receiving clock signals for synchronizing the operation of the sub-circuits, wherein the circuit comprises at least one sub-circuit provided with at least one internal circuit which passes a clock signal at a clock input of the one sub-circuit to a clock output of that sub-circuit, and a clock signal regeneration circuit having an input coupled to the clock output of said one sub-circuit and having an output coupled to a clock input of a further sub-circuit of said plurality of sub-circuits, wherein said clock signal regeneration circuit comprises:
   first and second inputs for first and second clock signals related in frequency,
   first and second pulse generator circuits having respective inputs coupled to said first and second inputs, and
   a set/reset flip-flop having a set input coupled to an output of the first pulse generator circuit and a reset input coupled to an output of the second pulse generator circuit, said flip-flop having first and second complementary outputs for supplying first and second regenerated clock signals to said clock input of the further sub-circuit.

18. A synchronized data processing circuit arrangement comprising: a plurality of sub-circuits for serially processing signal data, the sub-circuits including clock inputs for receiving clock signals for synchronizing the operation of the sub-circuits, wherein the circuit arrangement comprises at least one sub-circuit provided with at least one internal circuit which passes a clock signal at a clock input of the one sub-circuit to a clock output of that sub-circuit, and a clock signal regeneration circuit having an input coupled to the clock output of said one sub-circuit and having an output coupled to a clock input of a further sub-circuit of said plurality of sub-circuits, wherein said clock signal regeneration circuit comprises:
   first and second inputs for first and second clock signals related in frequency,
   first and second pulse generation circuits having respective inputs coupled to said first and second inputs,
   first and second flip-flops each having a set input and a reset input,
   first means coupling an output of the first pulse generator circuit to respective set and reset inputs of the first and second flip-flops,
   second means coupling an output of the second pulse generator circuit to respective reset and set inputs of the first and second flip-flops, and
   further coupling means for supplying first and second regenerated clock signals from respective outputs of the first and second flip-flops to said clock input of the further sub-circuit.

* * * * *